United States Patent
Theivanayagam et al.

(10) Patent No.: US 9,911,970 B2
(45) Date of Patent: Mar. 6, 2018

(54) LITHIUM ION BATTERIES

(71) Applicant: Dow Global Technologies LLC, Midland, MI (US)

(72) Inventors: Murali G. Theivanayagam, New Castle, DE (US); Ing-Feng Hu, Midland, MI (US); Hideaki Maeda, Tokyo (JP); Jui-Ching Lin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 87 days.

(21) Appl. No.: 14/899,779

(22) PCT Filed: Jun. 26, 2014

(86) PCT No.: PCT/US2014/044240
§ 371 (c)(1),
(2) Date: Dec. 18, 2015

(87) PCT Pub. No.: WO2015/006058
PCT Pub. Date: Jan. 15, 2015

(65) Prior Publication Data
US 2016/0149205 A1    May 26, 2016

Related U.S. Application Data

(60) Provisional application No. 61/844,122, filed on Jul. 9, 2013.

(51) Int. Cl.
*H01M 4/04* (2006.01)
*H01M 4/131* (2010.01)
(Continued)

(52) U.S. Cl.
CPC ......... *H01M 4/131* (2013.01); *H01M 4/0404* (2013.01); *H01M 4/0435* (2013.01);
(Continued)

(58) Field of Classification Search
USPC .................................................. 427/58, 115
See application file for complete search history.

(56) References Cited

U.S. PATENT DOCUMENTS

| | | |
|---|---|---|
| 5,858,324 A | 1/1999 | Dahn et al. |
| 5,871,866 A | 2/1999 | Barker et al. |

(Continued)

FOREIGN PATENT DOCUMENTS

| | | |
|---|---|---|
| EP | 0849817 | 6/1998 |
| EP | 0813256 | 5/2002 |

(Continued)

OTHER PUBLICATIONS

The Image Processing Handbook, 6th Ed., J.C. Russ, CRC Press, 2011 (Chapt. 11).

(Continued)

*Primary Examiner* — Brian K Talbot

(57) ABSTRACT

An improved method of making a cathode for use in a lithium ion battery is comprised of mixing a lithium metal oxide and lithium metal phosphate in a solvent, where both of these are comprised of primary particles that have been agglomerated into secondary particles of particular size and mixing is insufficient to break up the particles of the lithium metal phosphate, coating the mixture of step (A) on to a metal foil and removing the solvent to form the cathode. The lithium metal oxide is also desirably not broken either. The cathode may be one that has lithium metal oxide and a particular lithium metal phosphate wherein the majority of the metal is Mn.

10 Claims, 7 Drawing Sheets

(51) Int. Cl.

| | | |
|---|---|---|
| H01M 4/136 | (2010.01) | |
| H01M 4/1391 | (2010.01) | |
| H01M 4/1397 | (2010.01) | |
| H01M 4/36 | (2006.01) | |
| H01M 4/485 | (2010.01) | |
| H01M 4/505 | (2010.01) | |
| H01M 4/525 | (2010.01) | |
| H01M 4/58 | (2010.01) | |
| H01M 10/0525 | (2010.01) | |
| H01M 4/66 | (2006.01) | |
| H01M 4/02 | (2006.01) | |

(52) U.S. Cl.
CPC ......... *H01M 4/0471* (2013.01); *H01M 4/136* (2013.01); *H01M 4/1391* (2013.01); *H01M 4/1397* (2013.01); *H01M 4/364* (2013.01); *H01M 4/485* (2013.01); *H01M 4/505* (2013.01); *H01M 4/525* (2013.01); *H01M 4/5825* (2013.01); *H01M 4/661* (2013.01); *H01M 10/0525* (2013.01); *H01M 2004/028* (2013.01); *H01M 2220/20* (2013.01); *H01M 2220/30* (2013.01); *Y02T 10/7011* (2013.01)

(56) References Cited

U.S. PATENT DOCUMENTS

| | | | |
|---|---|---|---|
| 5,910,382 | A | 6/1999 | Goodenough et al. |
| 6,368,749 | B1 | 4/2002 | Yanai et al. |
| 6,514,640 | B1 | 2/2003 | Armand et al. |
| 6,528,033 | B1 | 3/2003 | Barker et al. |
| 6,632,566 | B1 | 10/2003 | Yamada et al. |
| 6,716,372 | B2 | 4/2004 | Barker et al. |
| 6,746,799 | B2 | 6/2004 | Yamada et al. |
| 6,749,967 | B2 | 6/2004 | Li et al. |
| 6,811,924 | B2 | 11/2004 | Hosoya et al. |
| 6,814,764 | B2 | 11/2004 | Hosoya et al. |
| 6,855,273 | B2 | 2/2005 | Ravet et al. |
| 6,964,828 | B2 | 11/2005 | Lu et al. |
| 7,029,795 | B2 | 4/2006 | Li |
| 7,087,346 | B2 | 8/2006 | Barker et al. |
| 7,169,511 | B2 | 1/2007 | Noda et al. |
| 7,217,474 | B2 | 5/2007 | Yamada et al. |
| 7,338,734 | B2 | 3/2008 | Chiang et al. |
| 7,351,500 | B2 | 4/2008 | Ueda et al. |
| 7,601,318 | B2 | 10/2009 | Armand et al. |
| 7,771,628 | B2 | 8/2010 | Barker et al. |
| 8,980,125 | B2 | 3/2015 | Endoh |
| 8,999,582 | B2 * | 4/2015 | Tessier .................... C01B 25/30 429/231.95 |
| 2004/0096743 | A1 | 5/2004 | Okae et al. |
| 2009/0142668 | A1 * | 6/2009 | Ishii ....................... G11B 5/596 429/231.8 |
| 2009/0305132 | A1 | 12/2009 | Gauthier et al. |
| 2010/0154206 | A1 * | 6/2010 | Mao ....................... H01B 1/08 29/623.5 |
| 2010/0327223 | A1 | 12/2010 | Zaghib et al. |
| 2011/0223482 | A1 * | 9/2011 | Fujii ..................... H01M 4/364 429/221 |
| 2012/0134914 | A1 * | 5/2012 | Paulsen ................... H01B 1/08 423/594.15 |
| 2012/0231341 | A1 * | 9/2012 | Kim ........................ C01G 51/42 429/223 |
| 2012/0282522 | A1 * | 11/2012 | Axelbaum ............. B82Y 30/00 429/219 |
| 2014/0199582 | A1 * | 7/2014 | Sasaki ................... H01M 4/043 429/162 |
| 2015/0349334 | A1 * | 12/2015 | Dumont ................ H01M 4/131 429/220 |

FOREIGN PATENT DOCUMENTS

| | | | |
|---|---|---|---|
| EP | 0782206 | | 4/2003 |
| EP | 0872450 | | 9/2004 |
| EP | 1296391 | | 6/2006 |
| EP | 1724860 | * | 11/2006 |
| EP | 1295851 | | 8/2008 |
| EP | 0918041 | | 11/2010 |
| EP | 2357693 | A1 | 8/2011 |
| EP | 2492996 | A2 | 8/2012 |
| EP | 2498323 | A2 | 9/2012 |
| EP | 2575201 | A1 | 4/2013 |
| WO | 2008/088180 | | 7/2008 |
| WO | 2008/091074 | | 7/2008 |
| WO | 2009/057834 | | 5/2009 |
| WO | 2013/016426 | | 1/2013 |

OTHER PUBLICATIONS

Jin Chong, et al., Journal of Power Sources 196 (2011) pp. 7707-7714.
Hsien-Chang Wu et. al., Journal of Power Sources 197 (2012) pp. 301-304.
Journal of Sedimentary Petrology, vol. 11, pp. 94-97, Aug. 1941.
Henk G. Merkus (Jan. 1, 2009) Particle Size Measurements: Fundamentals, Practice, Quality, Springer, pp. 15—Index Only.

* cited by examiner

ID BATTERIES

LITHIUM ION BATTERIES

FIELD OF THE INVENTION

The invention relates to a method making improved lithium ion batteries (LIBs) and cathodes to a make LIBs. In particular, the invention relates to lithium ion batteries comprised of lithium metal oxide cathode materials where improved battery characteristics may be achieved such as greater cycle life, safety and rate capability.

BACKGROUND OF THE INVENTION

Lithium ion batteries have over the past couple of decades been used in portable electronic equipment and more recently in hybrid or electric vehicles. Initially, lithium ion batteries first employed lithium cobalt oxide cathodes. Due to expense, toxicological issues and limited energy capacity other cathode materials have or are being developed.

One class of materials that has been developed and has been commercially employed is lithium metal oxides comprised of two or more of nickel, manganese and cobalt. These materials generally display a layered structure with a singular rhombohedral phase in which initial high specific charge capacities (~170 mAh/g) have been achieved when charged to voltages of about 4.2 volts vs Li/Li$^+$. Unfortunately, these materials have suffered from a short cycle life and safety issues related to oxygen evolution under certain conditions resulting in fires.

Li/Li+ represents the redox potential of the lithium reference electrode, which is defined as 0 volts by convention. Consequently, when using an anode other than Li metal, these voltages would be decreased to account for the difference in potential between this other anode and Li metal. Illustratively, a fully charged graphite anode has a potential of about 0.1 V vs Li/Li+. Therefore, when charging the cathode in a battery with a graphite anode to 4.25 V vs Li/Li+, the cell voltage will be approximately 4.15 V.

The cycle life is generally taken as the number of cycles (charge-discharge) before reaching a specific capacity that is 80% of the initial specific capacity. Each cycle for these materials is typically between the aforementioned 4.2 volts to 2 volts. These batteries have also suffered from inconsistencies in performance from one battery or cell to another, even though made from the same materials.

To solve some of the problems, the art has described numerous coatings, dopants as well as blending of other more stable cathode materials such as lithium iron phosphate. Examples include those described in U.S. Pat. Publ. Nos. 2004/0005265; 2004/0096743; 2006/0194112; and 2009/0305132; WO patent appl. Nos. 2008/088180; 2008/091074; 2009/057834; and 2013/016426 and Japanese Pat. No. 9035715A1. Unfortunately, even though these may have improved the safety of LIBs containing the cathode materials comprised of lithium metal oxides containing nickel, manganese, cobalt or combination thereof, the cycle life, battery capacity, or capacity at high rates of discharge were not improved.

Accordingly, it would be desirable to provide a method for forming LIBs having cathodes comprised of lithium metal oxides of nickel, manganese, cobalt or combinations thereof that results in more consistent performance, improved cycle life and greater energy capacity retention at faster charge/discharge rates while also improving the safety of such LIBs.

SUMMARY OF THE INVENTION

We have discovered an improved method to form LIBs comprised of lithium metal oxide cathodes having nickel, manganese, cobalt or combination thereof. A first aspect of the invention is a method of forming a cathode comprising:

(a) mixing a lithium metal oxide and lithium metal phosphate in a solvent, wherein (i) the lithium metal phosphate has a D50 secondary particle size by number of 2 micrometers to 30 micrometers and a D50 primary particle size by number that is 25 to 1000 nanometers, (ii) the lithium metal oxide has a secondary particle size having a D50 by number of 2 to 30 micrometers and, (iii) the mixing is insufficient to break up the secondary particles of the lithium metal phosphate, (b) coating the mixture of step (A) on to a metal foil; and (c) removing the solvent to form the cathode.

The method surprisingly has been found to allow a LIB to be formed that has improved cycle life, essentially the same volumetric energy capacity at low and high rates of discharge and increased safety compared to a LIB having a cathode without the lithium metal phosphate. This is so even though the true density of the metal phosphate is lower than the true density of the lithium metal oxide.

The maintaining of the integrity of the secondary particles of the lithium metal phosphate is believed to be essential to achieve these surprising results. It is not understood why this is so, but is believed to be due to multiple factors such as not disrupting any electronic conductive coating that may be on the lithium metal phosphate, distribution of the lithium metal oxide and lithium metal phosphate and compaction behavior of the mixture, for example, when roll pressing to form the cathode (calendaring).

A second aspect of the invention is a metal foil having a first and second face and cathode material coated on at least one face of the foil, the cathode material being comprised of a mixture of a lithium metal oxide and a lithium metal phosphate wherein the amount of lithium metal phosphate is 5% to 65% by weight of the mixture, wherein the lithium metal oxide is comprised of primary and secondary particles and the lithium metal phosphate is comprised of primary and secondary particles and the lithium metal oxide secondary particles have a D50 by number and lithium metal phosphate secondary particles have a D50 by number such that the D50 secondary particle size of the lithium metal oxide and lithium metal phosphate has a ratio of between 0.25 to 1.5.

The cathode of the second aspect when used in a LIB surprisingly gives improved press density, volumetric energy capacity at various discharge rates, improved safety, greater cycle life than cathodes made solely with the lithium metal oxide or lithium metal phosphate. That is, there appears to be a synergistic effect, when such a ratio of secondary particle sizes of the lithium metal oxide and lithium metal phosphate is realized.

A third aspect of the invention is a cathode comprised of a metal foil having a first and second face and cathode material coated on at least one face of the foil, the cathode material being comprised of a mixture of lithium metal oxide and lithium metal phosphate wherein the amount of lithium metal phosphate is 5% to 45% by weight of the mixture and the lithium metal phosphate has the formula $Li_aMn_bFe_cD_dPO_4$, wherein a is a number from 0.85 to 1.15;
b is from 0.51 to 0.95;
c is from 0.05 to 0.49;
d is from 0.000 to 0.1;
D being a metal ion selected from one or more of magnesium, calcium, strontium, cobalt, titanium, zirconium, molybdenum, vanadium, niobium, nickel, scandium, chromium, copper, zinc, beryllium, lanthanum and aluminum and the lithium metal phosphate has an electronic conductive coating thereon.

In the third aspect, it has been surprisingly found that even though the metal of lithium metal phosphate is primarily Mn, a LIB with such a cathode may have all the advantages of those previously mentioned. This is so even though it has been postulated that Mn is supposedly unstable due to dissolution in electrolytes used in LIBs (see, for example, WO 2013/016426).

A fourth aspect of the invention is a LIB comprised of any one of the cathodes of aspects 1 to 3.

The cathode, methods to make the cathode and LIBs made from the cathodes may be useful in any application requiring an electrochemical power source. Examples include transportation (e.g., electric and hybrid vehicles), electronics, power grid load leveling applications and the like.

DETAILED DESCRIPTION OF THE INVENTION

Figure 1:
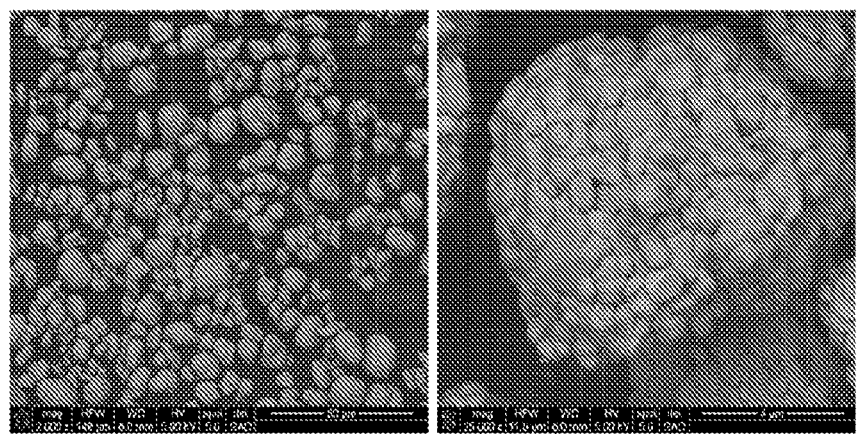
FIG. 1 is a scanning electron micrograph at two differing magnifications of a lithium metal oxide used to make the cathode of the invention.

The method of the first aspect of the invention uses a lithium metal oxide that is blended with a lithium metal phosphate in a particular way. The lithium metal oxide may be any that is capable of insertion and extraction of lithium in a LIB such as those known in the art. Examples of such lithium metal oxides include those described U.S. Pat. Nos. 5,858,324; 6,368,749; 6,964,828; and EP Pat. Nos. 0782206; 1296391; 0813256; 1295851; 0849817; 0872450; and 0918041 and JP Pat. No. 11-307094. Preferred metal oxides include those that have a layered structure of the Rm3 type also referred to as O3 structures that display a singular phase.

Preferred lithium metal oxides are those that are described by U.S. Pat. No. 6,964,828. Desirable lithium metal oxides also include those having the following formula.

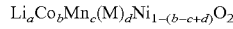

$Li_aCo_bMn_c(M)_dNi_{1-(b-c+d)}O_2$ where (M) denotes a metal other than Co, Mn or Ni and a is greater than 0 to 1.2; b is 0.1 to 0.5, c is 0.05 to 0.4 and d is 0 to 0.4 and b+c+d is 0.15 to 0.5. M is preferably B, Al, Si, Fe, V, Cr Cu, Zn, Ga and W. Preferably "a" is less than 1.1 and more preferably less than 1.05. It is understood that LIBs made from such cathode materials are assembled in the discharged state (i.e., lithium is present in the lithium metal oxide "a~1" and then is extracted and inserted into the anode upon charging the LIB for the first time). It is also understood that more than one lithium metal oxide may be used wherein the lithium metal oxide may differ in chemistry, primary particle size or the like.

The lithium metal oxide generally has a median (D50) primary particle size of 0.1 micrometer to 5 micrometers. Primary particle means the smallest distinct division of a given phase as is readily determined by microscopy and is analogous, for example, to a grain in a fully dense multigrain ceramic. The D50 primary particle size is desirably at least 0.2, 0.4 or 0.5 to 4, 3, or 2 micrometers. The particle size distribution is given by D10 and D90 particles sizes. D10 is the size where 10% of the particles are smaller and D90 is the particle size where 90% of the particles are smaller in a given distribution by number. The D10 typically is 0.1, 0.2, or 0.3 micrometer. The D90 is typically 8, 5, or 4 micrometers.

The lithium metal oxide has a median (D50) secondary particle size by number that is useful to achieve a suitable pour density and tap density to achieve suitable densities on a metal foil when making the cathode of this invention. Secondary particle size means a cluster of primary particles bonded together either by hard or soft bonding where hard bonding is by chemical bonds such as covalent or ionic bonding and soft bonding is by hydrogen, van der Waals or mechanical interlocking. The primary particles making up the lithium metal oxide typically are bonded at least in part by hard bonding. Generally, the D50 secondary particle size by number is 2 to 30 micrometers. Desirably, the secondary particle size D50 is 3, 4, or 5 to 25, 20 or 15 micrometers. The lithium metal oxide secondary particles typically have a D10 that is 3, 4, or 5 micrometer and a D90 that is 12, 16, or 20 micrometers.

As stated above, the lithium metal oxide is mixed with a lithium metal phosphate in a solvent. The lithium metal phosphate may be any that is capable of insertion and extraction of lithium. Suitable lithium metal phosphates include, for example, those described in U.S. Pat. Nos. 5,910,382; 6,514,640; 5,871,866; 6,632,566; 7,217,474; 6,528,033; 6,716,372; 6,749,967, 6,746,799; 6,811,924; 6,814,764; 7,029,795; 7,087,346; 6,855,273; 7,601,318; 7,338,734; and 2010/0327223. A preferred lithium metal phosphate is one in which a majority of the metal is Mn, which has a higher redox potential, for example, than iron in lithium iron phosphate. The higher redox potential of the Mn has been found to be useful in realizing a LIB with smooth or uniform discharge curves when mixed with the lithium metal oxides.

It has been discovered that the lithium metal phosphate secondary particulates need to have a median (D50) particle size by number of 10 nanometers to 1000 nanometers and D50 secondary particle size by number of 5 to 30 micrometers. It is desirable for the lithium metal phosphate primary particles to be at least 15, 20 or even 25 nanometers to at most 750, 500, 250, 100, or even 75 nanometers. It also has been discovered that it is critical that the lithium metal phosphate should be present as a secondary particle when being mixed with the lithium metal oxide and its median size (D50) should be within an order of magnitude of the lithium metal oxide median secondary particle size by number. Generally, the D50 secondary particle size by number is 2 to 30 micrometers. Desirably, the D50 secondary particle size is 3, 4, or 5 to 25, 20 or 15 micrometers. The lithium metal phosphate secondary particles typically have a D10 by number that is 3, 5, or 8 micrometers and a D90 that is 15, 25, or 35 micrometers.

Typically, the secondary particles of the lithium metal phosphate tend to only be softly bonded. Thus, it is essential that the mixing not be so vigorous such that these secondary particles break apart to an extent such that the performance of the LIB is deleteriously affected. The amount of breakage may be determined by microscopic techniques prior to and after mixing the lithium metal phosphate whereby the size and size distribution may be determined and compared. Typically after mixing the average secondary particle size should be within 30% of the median secondary particle size prior to mixing, preferably within 20%, and even more preferably within 10% and most preferably within 5% or statistically, insignificantly different.

The secondary particles of the lithium metal phosphate may be formed in situ, for example, when the lithium metal phosphate is made by a precipitation process, but more desirably, they are made from an agglomeration process such as by spray drying. It is desirable for the secondary particles to have an average projection sphericity or roundness (called sphericity in further discussion for simplicity) of 0.6 to 1.0. Desirably, the average projection sphericity is at least 0.4, 0.6 or 0.7 to at most 1. The sphericity is measured by Pentland method $(4*A)/(\pi*L^2)$, where A and L are the area and long diameter (maximum caliper) of the projection of particle, respectively, as described by *The Image Processing Handbook*, Sixth Ed., J. C. Russ, CRC Press, 2011 (Chapt. 11). Likewise, it has been discovered that the sphericity of the lithium metal oxide is also desirably as those just mentioned. In a preferred embodiment, the ratio of the sphericity (average) of the secondary particles of the lithium metal oxide/lithium metal phosphate is desirably 0.3 to 3.33 and more desirably 0.5 to 2, even more desirably 0.6 to 1.7 and most desirably 0.8 to 1.

The lithium metal phosphate depending on the particular metals may advantageously have an electronic coating thereon. The coating generally is present in an amount of 0.5% by weight to 20% by weight of the lithium metal phosphate and said coating. It is desirable to have as little coating as possible and as such the amount is desirably at most 10%, 8%, 5% or even 3%. Typically, the coating is carbonaceous and may include graphitic carbon, amorphous carbon or combinations thereof. A desirable carbon coating may be one resulting from the carburization of an organic compound such as those known in the art, with examples being phenol, formaldehydes, sugars (e.g., lactose, glucose and fructose), starches, and celluloses.

It has been discovered that it is further advantageous for the lithium metal oxide and lithium metal phosphate to have average secondary particle sizes that are substantially near each other so that one does not form a coating and allows, for example, the deformation of the lithium metal phosphate upon pressing to form a cathode (layer of the mixture pressed on to a metal foil). It is not understood why this is important, but may be as stated previously or that it is important to have a reservoir of lithium metal phosphate that is not substantially interacting with the lithium metal oxide (combination of interacting and non-interacting). Thus, it is desirable for the lithium metal oxide and lithium metal phosphate to have a ratio of median (D50) secondary particle size that is from 0.5 to 1.5. It may also be desirable for the ratio to be 0.6, 0.7, 0.8 or even 0.9 to 1.4, 1.3, 1.2 or even 1.1.

When mixing the lithium metal oxide and lithium metal phosphate, the amount of each generally may be any useful amount. Typically, however, the mixture typically has at least 5% to 65% by weight of the lithium metal phosphate. Note, if an electronic coating is present on either the oxide or phosphate, it is included in the aforementioned weight percentages. Desirably, the amount of the lithium metal phosphate is at most 50%, 49%, 40%, 30%, or even 20% to at least 10%.

A desirable lithium metal phosphate is one that has an empirical formula: $Li_aMn_bFe_cD_dPO_4$, wherein a is a number from 0.85 to 1.15;

b is from 0.51 to 0.95;

c is from 0.05 to 0.49;

d is from 0.000 to 0.1;

D being a metal ion selected from one or more of magnesium, calcium, strontium, cobalt, titanium, zirconium, molybdenum, vanadium, niobium, nickel, scandium, chromium, copper, zinc, beryllium, lanthanum and aluminum. It is preferred that the lithium metal phosphate is one having an empirical formula $Li_aMn_bFe_cD_dPO_4$, wherein a is a number from 0.85 to 1.15;

b is from 0.65 to 0.95;

c is from 0.049 to 0.349;

d is from 0.001 to 0.1;

$2.75 \leq (a+2b+2c+dV) \leq 3.10$, wherein V is the valence of D, and D is a metal ion selected from one or more of magnesium, calcium, strontium, cobalt, titanium, zirconium, molybdenum, vanadium, niobium, nickel, scandium, chromium, copper, zinc, beryllium, lanthanum and aluminum, and further wherein at least a portion of the lithium metal phosphate has an olivine structure. It is further preferred that D is magnesium, cobalt or combination thereof. This particular phosphate material has been found to not only improve cycle life even though it has high Mn concentration, but also not deleteriously affect the voltage discharge profiles of the battery as do high iron containing lithium metal phosphates.

The lithium metal oxide and lithium metal phosphate are mixed in a solvent so as to allow for a uniform mixture to be formed and to decrease the possibility of breaking the secondary particles of the lithium metal phosphate. The solvent may be any suitable solvent such as those known in the art and typically are polar and apolar organic solvents with low water contents (e.g., 500 ppm or less and preferably less than 100, 50, 10 or even 1 ppm). Examples of useful solvents include organic solvents such as n-methyl pyrrolidone (NMP) and acetone and polar solvents such as water and those described by Jin Chong, et al., *Journal of Power Sources* 196 (2011) pp. 7707-7714.

The amount of solids (lithium metal oxide and phosphate) may be any useful amount. Typically the amount is from 10% to 90% by volume of the solvent and may be at least 20% or 30% to at most 80% or 70%.

As indicated previously, it is essential that the mixing be under conditions that do not break the secondary particles of the lithium metal phosphate. Typically, this requires low shear mixing techniques such as simple paddle mixers with or without baffles. A high shear mixer (e.g. colloid mill) may be used so long as the shear forces or the gaps employed do not impinge and break the secondary particles as described above. Generally, the shear rate is at most about 5000 $sec^1$ and generally is about 1 $sec^1$ to about 1000 $sec^{-1}$. Other known additives useful for casting slurries on to foils may be utilized, such as suitable dispersants, lubricants, binders and water scavengers.

The mixing is performed for a time to disperse the lithium metal oxide and lithium metal phosphate sufficiently so that the desired results are achieved. Typically the time may be from several minutes to any time that is practicable such as days or hours.

The mixture is then coated on to a metal foil that is useful for making electrodes in batteries such as aluminum, carbon coated aluminum, etched aluminum, nickel, copper, gold, silver, platinum, and alloys of the aforementioned or combinations thereof and include those described in Hsien-Chang Wu et. al., *Journal of Power Sources* 197 (2012) pp. 301-304.

The coating of the slurry may be done by any useful technique such as those known in the art. Typically, the method employed is a doctor blade casting at a desired gap.

The solvent is then removed to form the cathode. The removing may be any suitable method such as evaporating with or without heating under as static or flowing air or other suitable atmosphere such as dry air, inert atmosphere (nitrogen or inert gas such as a noble gas) or vacuum. If heating is employed, the temperature is any useful for the particular solvent employed and may be 30° C. to 500° C., but is preferably 50 to 150° C. The time may be any suitable time such as several minutes to days or hours. The heating may be any useful heating such as resistance, convection, microwave, induction or any known heating method.

In an embodiment, after the solvent has been removed, the cathode is further subjected to pressing. This pressing in many instances is referred to calendaring in the art to further increase the density of the lithium metal oxide/lithium metal phosphate coating on the metal foil. Typically, calendaring is performed by passing the cathode through a roll press with a set gap to realize a cathode with uniform thickness. The cathode may be passed through the roll press multiple times with changing gaps or the same gap depending on the behavior of the coating. When doing the pressing, it is desirable to only distort the secondary particles of the lithium metal phosphate and not have any appreciable change such as fracturing of the lithium metal phosphate secondary particles. Generally, this corresponds to a pressure that is at most about 500 MPa and is desirably at most about 250, 180, 170 or 160 MPa to some low pressure which may be at least about 10 MPa. Likewise, the pressure should not be so great to cause any electronic conducting coating to be fractured off the lithium metal phosphate and also not so high that the density of the coating is too high, for example, the electrolyte employed in the battery has difficulty wetting the cathode sufficiently to achieve the desired results.

Typically, the coating has a % theoretical density that is 40% to 85% of theoretical density (60% to 15% porous). It is desirable for the theoretical density to be at least 45%, 50% or even 55% to 80%, 75% or even 70%.

The cathode is useful in making improved LIBs and when making such LIBs, suitable anode materials include, for example, carbonaceous materials such as natural or artificial graphite, carbonized pitch, carbon fibers, graphitized mesophase microspheres, furnace black, acetylene black, and various other graphitized materials. Suitable carbonaceous anodes and methods for making them are described, for example, in U.S. Pat. No. 7,169,511. Other suitable anode materials include lithium metal, lithium alloys, other lithium compounds such as lithium titanate and metal oxides such as $TiO_2$, $SnO_2$ and $SiO_2$, as well as materials such as Si, Sn, or Sb. The anode may be made using one or more suitable anode materials.

The separator of the LIB is generally a non-conductive material. It should not be reactive with or soluble in the electrolyte solution or any of the components of the electrolyte solution under operating conditions but must allow lithium ionic transport between the anode and cathode. Polymeric separators are generally suitable. Examples of suitable polymers for forming the separator include polyethylene, polypropylene, polybutene-1, poly-3-methylpentene, ethylene-propylene copolymers, polytetra-fluoroethylene, polystyrene, polymethylmethacrylate, polydimethylsiloxane, polyethersulfones and the like.

Generally, the battery electrolyte solution has a lithium salt concentration of at least 0.1 moles/liter (0.1 M), preferably at least 0.5 moles/liter (0.5 M), more preferably at least 0.75 moles/liter (0.75 M), preferably up to 3 moles/liter (3.0 M), and more preferably up to 1.5 moles/liter (1.5 M). The lithium salt may be any that is suitable for battery use, including lithium salts such as $LiAsF_6$, $LiPF_6$, $LiPF_4(C_2O_4)$, $LiPF_2(C_2O_4)_2$, $LiBF_4$, $LiB(C_2O_4)_2$, $LiBF_2(C_2O_4)$, $LiClO_4$, $LiBrO_4$, $LiIO_4$, $LiB(C_6H_5)_4$, $LiCH_3SO_3$, $LiN(SO_2C_2F_5)_2$, and $LiCF_3SO_3$. The solvent in the battery electrolyte solution may be or include, for example, a cyclic alkylene carbonate like ethylene carbonate; a dialkyl carbonate such as diethyl carbonate, dimethyl carbonate or methylethyl carbonate, various alkyl ethers; various cyclic esters; various mononitriles; dinitriles such as glutaronitrile; symmetric or asymmetric sulfones, as well as derivatives thereof; various sulfolanes, various organic esters and ether esters having up to 12 carbon atoms, and the like.

EXAMPLES

Sphericity of particles was measured by Pentland method as described earlier.

The particle size was measured using a Coulter particle size analyzer (Coulter LS230, Bechman Coulter Inc., Brea, Calif.). Surface area of the particles was measured by multi-point Brunauer-Emmett-Teller (BET) surface area measurement based on $N_2$ gas adsorption on sample surfaces (Micromeritics Tristar II, Micromeritics Instrument Corp., Norcross, Ga.). True density was determined from the X-ray crystal data. Tap density was measured using 1000 taps by TAP-2s tap density tester available from Logan Instruments Corporation, Somerset, N.J.

The Examples and Comparative Examples, when a lithium metal oxide was present, used lithium metal oxide (LMO) available from 3M, St. Paul, Minn., having the chemical formula $Li_{1.10}Ni_{0.42}Mn_{0.42}Co_{0.17}O_2$ and the properties are shown in Table 1 and a micrograph of this powder is shown in FIG. 1.

Three lithium manganese iron phosphates (LMFPs) were used. The first was made as follows and is referred to as "LMFP A". Iron oxalate dihydrate and manganese carbonate were mixed with water in an amount sufficient to render the mixture fluid enough to pour and pump. If a dopant metal was used, the dopant metal precursor(s) used were magnesium acetate and/or cobalt acetate. 85% Phosphoric acid in water by weight is slowly added to the mixture. After the acid addition is finished, the mixture is mixed for about 30 minutes more.

The mixture was milled using zirconia media until the particles were reduced to approximately 50 nm in diameter. During the milling, cellulose acetate was added to realize the carbon content as shown in Table 1.

The milled mixture was spray dried at 170° C. to agglomerate the small particles into essentially spherical secondary particles having diameters of up to about 20 microns. The spray dried particles were heated under an atmosphere containing <100 ppm oxygen. The particles were heated from room temperature to 400° C. over three hours and held at 400° C. for one hour. The temperature was then increased to 650° C. over two hours and held at 650° C. for three hours. The heated particles were cooled to below 60° C. and sieved through a 44 micron sieve. A micrograph of LMFP A appears in FIG. 2 and the characteristics of this LMFP A are shown in Table 1.

Figure 3:
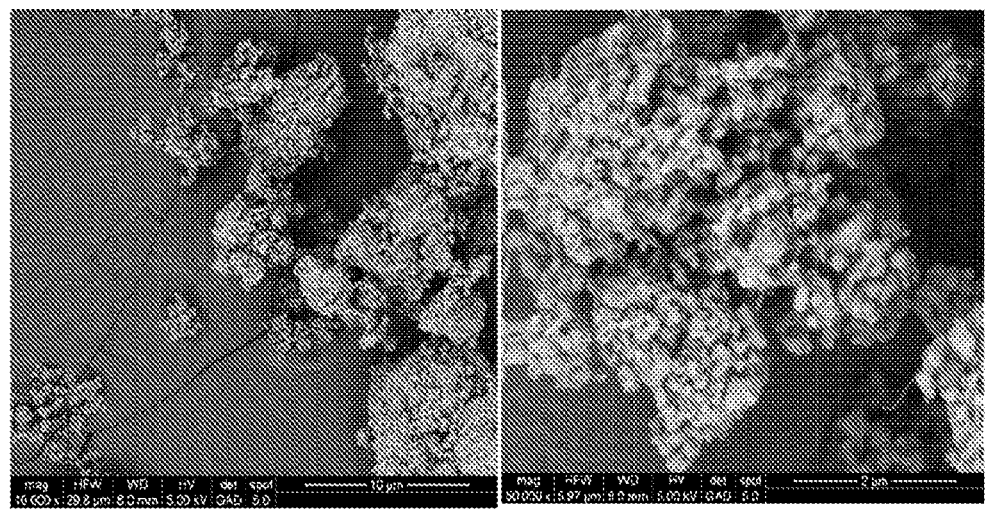
FIG. 3 is a scanning electron micrograph at two differing magnifications of a lithium metal phosphate not applicable to making the cathode of the invention.

The second LMFP (referred to as "LMFP B") was made by milling Ketjen black (EC600JD) available from AkzoNobel Chemicals S.A., Parc Industriel de Ghlin, Belgium, lithium dihydrogen phosphate, iron oxalate dihydrate, and manganese carbonate in a CM20 Simoloyer mill available from Zoz GmbH, Wenden, Germany using stainless steel grinding media at 450 RPM for 2 to 3 hours followed by calcination at 650 to 700° C. for 1 hour in Argon. The characteristics of LMFP B are shown in Table 1 and a micrograph of this LMFP appears in FIG. 3. In FIG. 3, the majority of the particles are dispersed as primary particles with the remaining particles being loosely agglomerated in secondary particles. Since there is in essence a lack of secondary particles, this LMFP's secondary particulate sphericity was not measured (i.e., not applicable).

Figure 4:
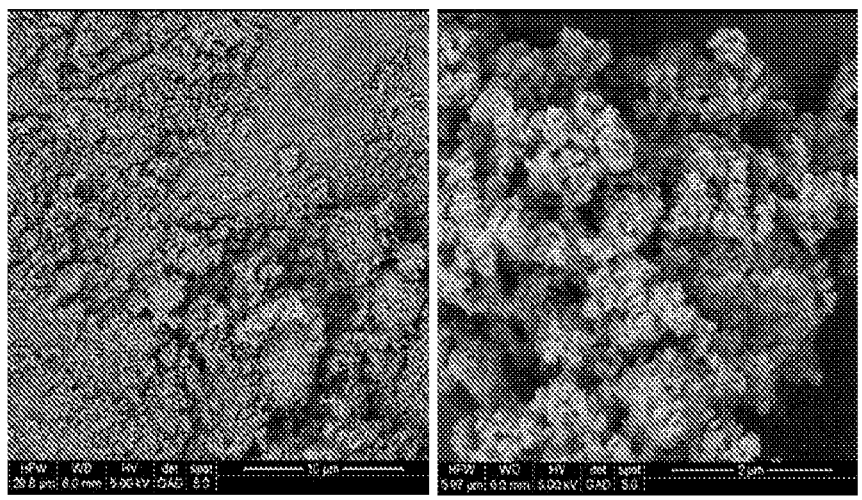
FIG. 4 is a scanning electron micrograph at two differing magnifications of a lithium metal phosphate not applicable to making the cathode of the invention.

The third LMFP referred to as "LMFP C" is the same as LMFP A except that after being formed, the LMFP A was milled in a PM 400 planetary mill (Retsch GmbH, Haan, Germany) run at 200 rpm for 20 minutes in using 5 mm diameter yttrium stabilized zirconia media. The powder to media ratio was (1/10). The characteristics of LMFP C are shown in Table 1 and a micrograph of this LMFP appears in FIG. 4. From FIGS. 2 to 4, it is evident that LMFP B and C are essentially comprised of separated primary particles.

Examples 1 to 6

In these Examples, LMFP A was blended with the LMO described above in the weight ratios given in Table 2.

LMFP A was blended with the LMO as follows. 3.5 (pbw) of binder (Solef 5130 from Solvay, which was added as a 5% by weight solution of N-Methylpyrrolidone (NMP)) and 2.5 (pbw) conductive carbon (SuperP conductive carbon from TIMCAL graphite and carbon) was mixed for 5 minutes at 2000 RPM in a mixer (FlackTek, Inc. Speedmixer (DAC150, FV2-k)). LMFP A was mixed with binder/carbon mixture with an amount of NMP to realize a 55% to 60% total solids loading for an additional 5 minutes of the final mixture. LMO was then added to realize the ratio of LMFP to LMO ratio as shown in Table 2 and mixed for 10 minutes at 2500 RPM, which is the same rpm used throughout.

Figure 5:
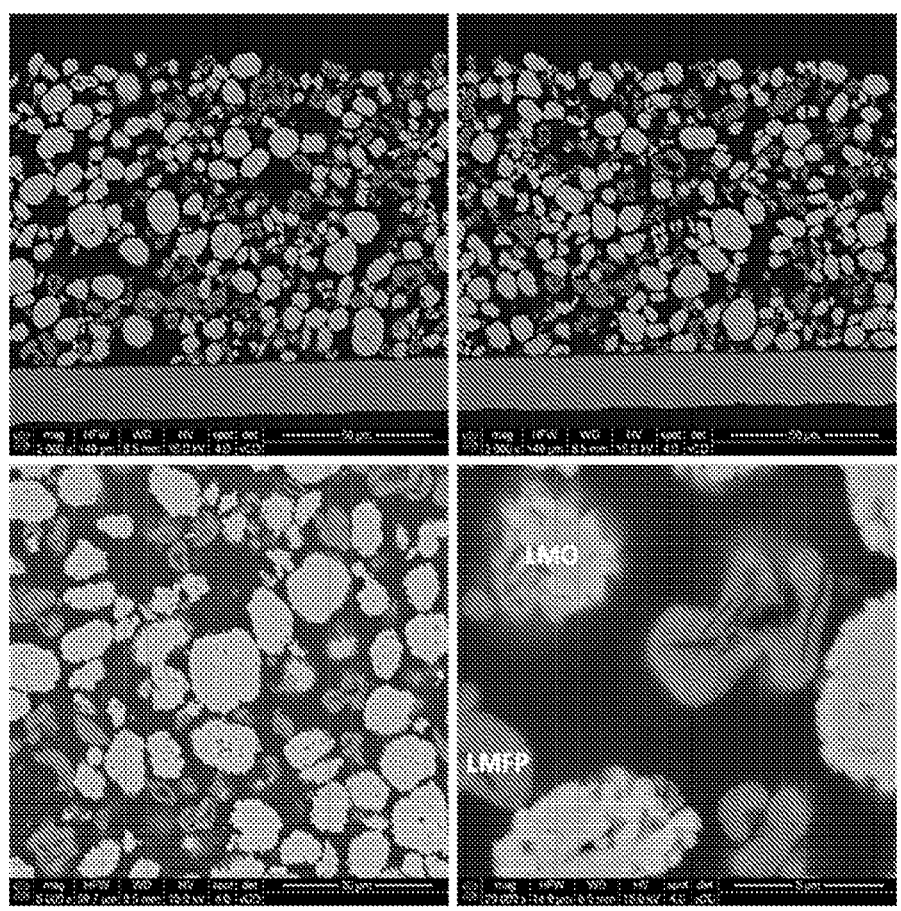
FIG. 5 is a scanning electron micrograph at differing magnifications of a cross-section of a cathode of this invention, in which the cathode has not been pressed.

The slurry was coated using a doctor blade onto an aluminum foil (15 microns thick) available from MTI Corporation. After coating, the NMP was removed by drying at 130° C. in air for 15 minutes to form the cathode. The thickness of the coating was about 70 to 80 micrometers. FIG. 5 is a scanning electron micrograph of a cross-section of the coating after drying of Example 1. Generally, for each of the Examples, the sphericity of the secondary particles of the LMO and LMFP A were essentially the same as that of the starting LMO and LMFP.

Figure 6:
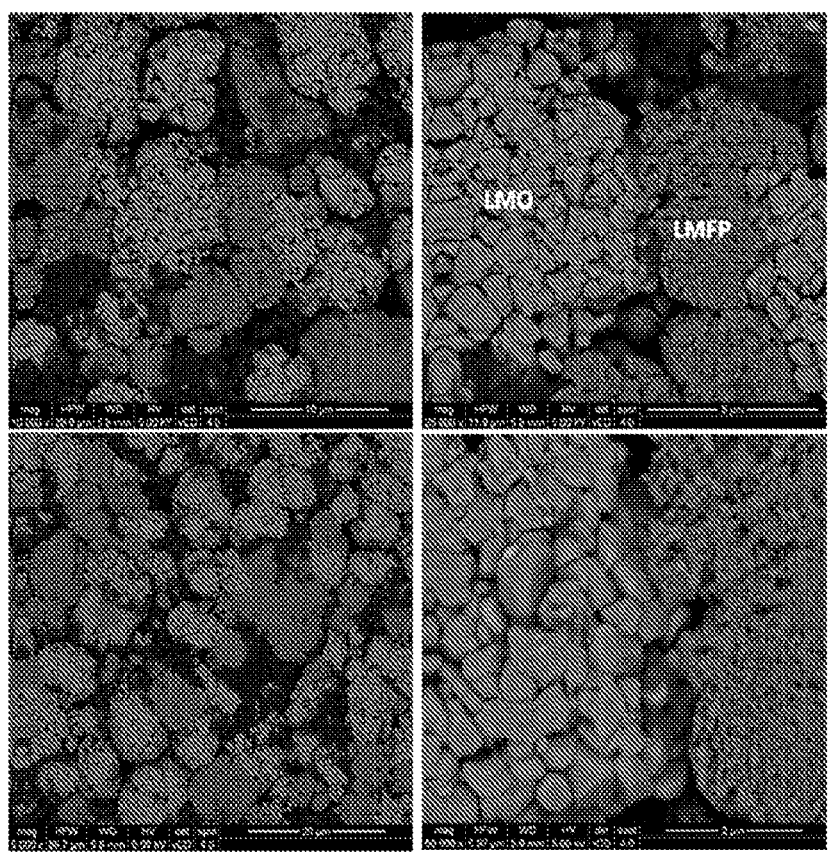
FIG. 6 is a scanning electron micrograph at differing magnifications looking down at the top of a cathode of this invention, in which the cathode has been pressed.

The cathode was then further pressed using a roll press to a density of about 3 g/cc active material. Density of active material means the density of the LMFP and NMC as calculated from the measured volume and weight. The pressed cathode was punched to form circular cathodes of 1.6 cm² area and further dried under vacuum at 125° C. for at least 8 hours. FIG. 6 is a scanning electron micrograph looking down at the top of the Example 1 mixture after it was pressed. The sphericity of the LMFP was not determined due to extensive distortion, but the LMO again had essentially the same sphericity as the powder, which is also the case for each of the Comparative Examples after pressing.

Figure 2:
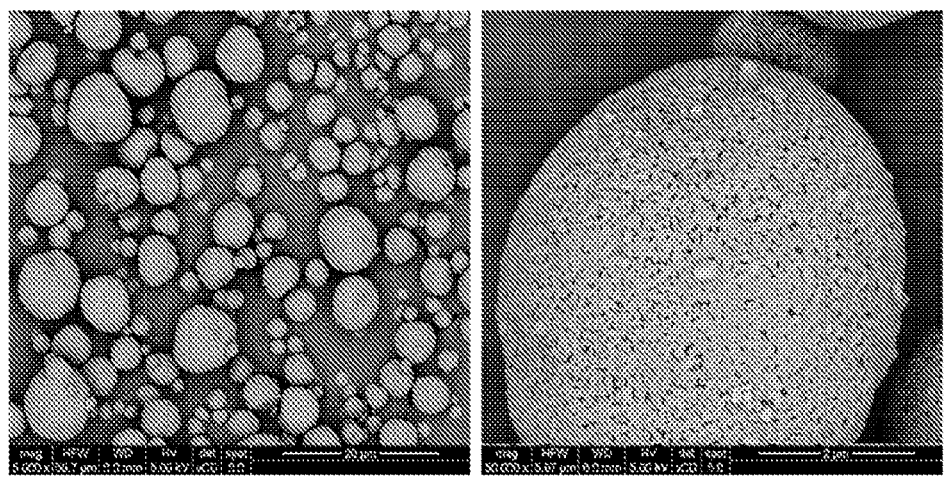
FIG. 2 is a scanning electron micrograph at two differing magnifications of a representative lithium metal phosphate used to make the cathode of the invention.

From FIGS. 1, 2, and 5, it is evident that the shear rate of the mixing used to make the mixture of LMFP A and LMO was insufficient to break apart secondary particles of either of these. Likewise, from FIG. 6, it is evident that the roll pressing (calendaring) was insufficient to break apart either the LMO or LMFP A, but was sufficient to distort the LMFP secondary particles, which is believed to enhance the density of the coating on the aluminum foil making up the cathode.

The pressed and punched cathodes were incorporated into CR2025 coin cells. The cells were charged using a constant current (1/10 C-rate) to 4.25V, and then held at constant voltage of 4.25 until the current decayed to C/100. The discharge was done at constant current (varying with different C-rates) with a voltage cutoff of 3.0 V. The anode in each case is lithium (in the case of a half cell) and a commercially available graphite, (AGP-2 powder obtained from BTR New Energy Materials Inc., Shenzhen, China), (in the case of a full cell), the anode/cathode capacity ratio is 1.1 to 1.2 for the full cells. A commercially available separator is used with an electrolyte of a 1.15 molar $LiPF_6$ solution in a 1:3 by weight mixture of ethylene carbonate and ethylmethylcarbonate that also contains 2% by weight vinylidene carbonate. Cycle life was evaluated at 50° C. in coin cells against graphite anode. The electrolyte used in the coin cells was 1 M $LiPF_6$ in EC/EMC (1:3) with 2% VC.

The thermal behavior (DSC) of charged cathodes were measured by charging the cathode to 4.25 V in coin half cell against lithium metal, then disassembling the cells in dry room, and sealing them in hermetically tight DSC pans with the residual electrolyte left in the cathode. The DSC pans are then heated at a heating rate of 10° C./min and the observed heat is plotted vs. temperature, with the results for selected Examples and Comparative Examples shown in Table 3.

Oxygen evolution of charged cathodes were measured by charging the cathode to 4.25 V in coin half cell against lithium metal, then disassembling the cells in an Argon filled glove box. The electrodes were washed with dimethyl carbonate solvent to remove the electrolyte and dried under vacuum at 25° C. for 12 hours. The dried electrodes were heated under Argon at 10° C./minute in a mass spectroscopy with evolved gas analysis (oxygen) for selected examples and comparative examples shown in Table 3.

Comparative Example 1

Cathodes and cells were made in the same manner as for Examples 1 to 6 described above except that the cathodes were made using the LMO only. The density of the coating on the cathode after pressing and the characteristics of the cells are shown in Table 2.

Comparative Example 2

Cathodes and cells were made in the same manner as for Examples 1 to 6 described above except that the cathodes were made using LMFP A only. The density of the coating on the cathode after pressing and the characteristics of the cells are shown in Table 2.

Comparative Examples 3 to 5

Cathodes and cells were made in the same manner as for Examples 1 to 6 described above except that the cathodes were made using LMFP B blended with the LMO in the ratios shown in Table 2. The density of the coating on the cathode after pressing and the characteristics of the cells are also shown in Table 2.

Comparative Examples 6 to 8

Cathodes and cells were made in the same manner as for Examples 1 to 6 described above except that the cathodes were made using LMFP C blended with the LMO in the ratios shown in Table 2. The density of the coating on the cathode after pressing and the characteristics of the cells are also shown in Table 2.

From Table 2, Examples 1 and 2 have essentially the same battery performance of Comparative Example 1. This is so even though the true density of the LMFP A is substantially lower than the true density of the LMO. It is believed this effect is due to an unexpected improved packing of particles without compromising conductivity when it comes to performance at high discharge rates. This surprising battery performance, however, is not observed when the LMFP fails to retain the secondary particle cohesiveness as displayed by the battery performance of Comparative Examples 3 to 8. Likewise, Comparative Example 2 shows that LMFP A does not display similar performance and as such the improvement in battery performance of the Examples 1 to 3 is not as a result of a mere rule of mixture. Examples 4-6 show that the performance improvement continues even at high concentrations of LMFP. For example, the discharge capacity at 10 C of Examples 4-6 is greater than each of Comparative Examples 3-8.

Figure 7:
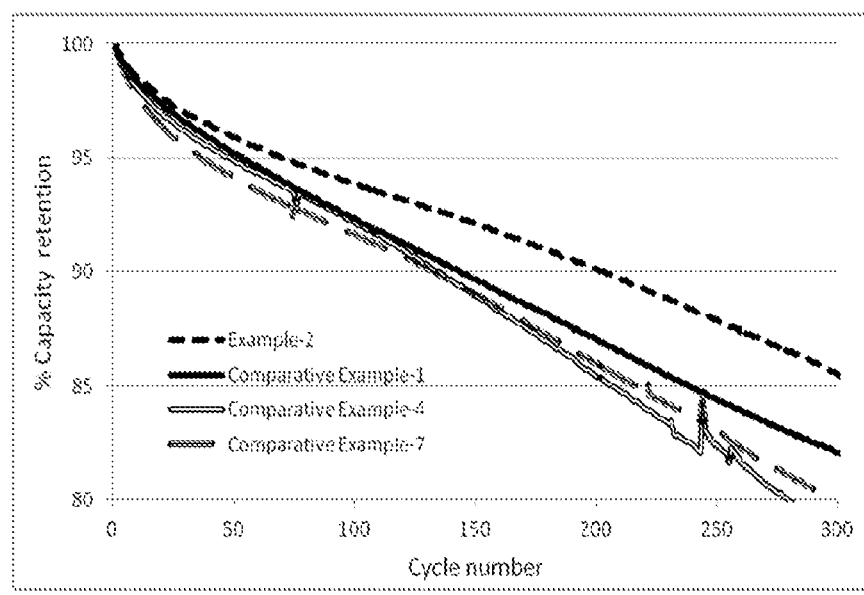
FIG. 7 is a graph of the cycle life of an example of a LIB battery of the present invention compared to LIBs not of this invention.

The cycle life of Example 2, and Comparative Examples 1, 4 and 7 is shown in FIG. 7 measured in a coin cell. From this figure, it is evident the cycle life of a battery is substantially improved when using the process to make a coated cathode that has a blended LMO/LMFP mixture wherein the LMFP retains cohesiveness of the LMFP secondary particles and the LMO secondary particles retain their shapes.

Table 3 compares the DSC analysis of Examples 1, 2, and comparative example 1. The bare NMC cathode (comparative example 1) shows two characteristic heat evolution peaks, one at 244° C. and the second peak at 314° C. The addition of LMFP to NMC shifts both the exothermic peaks to higher temperatures, which is beneficial. Also, the shift in temperature is proportional to the amount of LMFP added in the blend.

Inhibiting or lowering the oxygen evolution from a charged cathode is important to improve the safety of NMC cathodes. Table 3 compares the oxygen evolution from bare NMC (Comparative Example 1) and NMC blended with LMFP (Examples 1 and 2). Charged NMC cathode releases oxygen with the peak onset temperature around 265° C. Addition of LMFP cathode to NMC delays, shifts the oxygen evolution to higher temperature, and also decreases the amount of oxygen evolved.

TABLE 1

| Characteristic | LMO | LMFP A | LMFP B | LMFP C |
|---|---|---|---|---|
| Chemistry | $Li_{1.10}Ni_{0.42}Mn_{0.42}Co_{0.17}O_2$ | $Li_{1.05}Mn_{0.75}Fe_{0.15}Mg_{0.05}Co_{0.003}PO_4$ | $Li_{1.025}Mn_{0.80}Fe_{0.20}PO_4$ | $Li_{1.05}Mn_{0.75}Fe_{0.15}Mg_{0.05}Co_{0.003}PO_4$ |
| Surface Area (m$^2$/g) | 0.31 m$^2$/g | 24 | 35 | 28 |
| D10 (μm) | 4 | 3.8 | 2.9 | 1 |
| D50 (μm) | 8 | 8.2 | 11.3 | 6 |
| D90 (μm) | 13 | 13 | 46.5 | 27 |
| Tap density (g/cc) | 2.2 | 1.1-0.9 | 0.7 | 1.1 |
| Sphericity of Secondary Particles | 0.68 | 0.78 | Not applicable | Not applicable |
| True density (g/cc) | 4.6 | 3.45 | 3.45 | 3.45 |
| Carbon (wt %) | Not applicable | 3 | 8 | 3 |

TABLE 2

| Ex. | LMNO/LMFP Wt. ratio | Active Material Density (g/cc) | Discharge capacity @ 0.1 C (mAh/g) | Gravimetric energy density @ 0.1 C (Wh/Kg) | Volumetric energy density @ 0.1 C (Wh/L) | Discharge capacity @ 10 C (mAh/g) | Gravimetric energy density @ 10 C (Wh/Kg) | Volumetric energy density @ 10 C (Wh/L) |
|---|---|---|---|---|---|---|---|---|
| 1 | 90/10 | 3 | 160 | 619.2 | 1857.7 | 92 | 318.3 | 955.0 |
| 2 | 80/20 | 3 | 159 | 616.1 | 1848.4 | 82 | 277.2 | 831.5 |
| 3 | 60/40 | 2.8 | 157 | 610.0 | 1707.9 | 97 | 339.5 | 950.6 |
| 4 | 20/80 | 2.0 | 147 | 575 | 1150 | 98 | 327 | 655 |
| 5 | 30/70 | 2.1 | 149 | 581 | 1220 | 96 | 322 | 675 |
| 6 | 40/60 | 2.3 | 149 | 581 | 1336 | 85 | 288 | 663 |
| Comp Ex 1 | 100/0 | 3 | 161 | 621.1 | 1863.4 | 91 | 314.9 | 944.6 |
| Comp Ex 2 | 0/100 | 1.7 | 148 | 581.6 | 988.7 | 107 | 368.1 | 625.8 |
| Comp Ex 3 | 90/10 | 3 | 157 | 607.6 | 1822.8 | 45 | 154.8 | 464.4 |
| Comp Ex 4 | 80/20 | 2.9 | 151 | 581.5 | 1685.9 | 76 | 260.7 | 756.0 |
| Comp Ex 5 | 60/40 | 2.7 | 150 | 577.5 | 1559.3 | 65 | 217.1 | 586.2 |
| Comp Ex 6 | 90/10 | 3 | 159 | 615.3 | 1846.0 | 55 | 187.6 | 562.7 |
| Comp Ex 7 | 80/20 | 2.9 | 157 | 606.0 | 1757.5 | 59 | 199.4 | 578.3 |
| Comp Ex 8 | 60/40 | 2.6 | 155 | 601.4 | 1563.6 | 65 | 217.1 | 564.5 |

TABLE 3

| Sample | LMO/LMFP Wt. ratio | DSC Peak 1 Temperature (° C.) | DSC Peak 2 Temperature (° C.) | DSC Total Heat (J/g of cathode) | Oxygen Evolution Onset Temperature (° C.) | Evolved Oxygen (%) |
|---|---|---|---|---|---|---|
| Comparative example 1 | 100/0 | 244 | 316 | 587 | 262 | 100% |
| Example 1 | 90/10 | 261 | 320 | 717 | 282 | 66% |
| Example 2 | 80/20 | 262 | 323 | 687 | 310 | 35% |
| Example 3 | 60/40 | 260 | 327 | 569 | 315 | 18% |

The invention claimed is:

1. A method of forming a cathode comprising:
    (a) mixing a lithium metal oxide and lithium metal phosphate in a solvent, wherein (i) the lithium metal phosphate has a D50 secondary particle size by number of 2 micrometers to 30 micrometers and a D50 primary particle size by number that is 25 to 1000 nanometers, (ii) the lithium metal oxide has a secondary particle size having a D50 by number of 2 to 30 micrometers and, (iii) the mixing is insufficient to break up the secondary particles of the lithium metal phosphate,
    (b) coating the mixture of step (A) on to a metal foil; and
    (c) removing the solvent to form the cathode wherein the lithium metal phosphate primary particles are soft bonded within the secondary particles and the lithium metal oxide secondary particles are at least partially hard bonded.

2. The method of claim 1, further comprising pressing the cathode after removing the solvent.

3. The method of claim 2, wherein the pressing is performed at a pressure insufficient to deform or break the lithium metal oxide secondary particles, but sufficient to deform the lithium metal phosphate secondary particles.

4. The method of claim 3, wherein the pressing is performed at a pressure from 10 MPa to 250 MPa.

5. The method of claim 4, wherein the lithium metal oxide has an average sphericity from 0.4 to 1.0 and the lithium metal phosphate has an average sphericity from 0.4 to 1.0.

6. The method of claim 5, wherein the average sphericity of the lithium metal oxide to the average sphericity of the lithium metal phosphate has a ratio that is 0.4 to 2.5.

7. The method of claim 1, wherein the mixing has a shear rate of at most 5000 sec-1.

8. The method of claim 1, wherein the lithium metal oxide has a D50 primary particle size of 3 micrometers to 0.1 micrometers.

9. The method of claim 1, wherein the D50 secondary particle size of the lithium metal phosphate to the D50 secondary particle size of the lithium metal oxide has a ratio that is 0.25 to 1.5.

10. The method of claim 6, wherein the ratio is 0.5 to 1.5.

* * * * *